US011473943B2

United States Patent
Horikx et al.

(10) Patent No.: US 11,473,943 B2
(45) Date of Patent: Oct. 18, 2022

(54) OPTICAL FIBER SENSOR

(71) Applicants: Koninklijke Philips N.V., Eindhoven (NL); Fujikura Ltd., Tokyo (JP)

(72) Inventors: Jeroen Jan Lambertus Horikx, Eindhoven (NL); Gert Wim 'T Hooft, Eindhoven (NL); Anna Hendrika Van Dusschoten, Eindhoven (NL); Shingo Matsushita, Eindhoven (NL); Ichii Kentaro, Eindhoven (NL)

(73) Assignees: FUJIKURA LTD., Tokyo (JP); KONINKLIJKE PHILIPS N.V., Eindhoven (NL)

(*) Notice: Subject to any disclaimer, the term of this patent is extended or adjusted under 35 U.S.C. 154(b) by 0 days.

(21) Appl. No.: 17/206,669

(22) Filed: Mar. 19, 2021

(65) Prior Publication Data

US 2021/0223030 A1 Jul. 22, 2021

Related U.S. Application Data

(63) Continuation of application No. PCT/EP2019/075334, filed on Sep. 20, 2019.

(30) Foreign Application Priority Data

Sep. 20, 2018 (EP) .................... 18 195 646

(51) Int. Cl.
*G02B 6/00* (2006.01)
*G01D 5/353* (2006.01)
(Continued)

(52) U.S. Cl.
CPC ......... *G01D 5/3538* (2013.01); *G01B 11/161* (2013.01); *G01H 9/004* (2013.01);
(Continued)

(58) Field of Classification Search
CPC .... G01D 5/3538; G01B 11/161; G01B 11/18; G01H 9/004; G01L 1/242; G02B 6/02042;
(Continued)

(56) References Cited

U.S. PATENT DOCUMENTS 9,523,787 B2 * 12/2016 Jaaskelainen ....... H01S 3/06733
10,502,558 B2 12/2019 Sasaki et al.
(Continued)

FOREIGN PATENT DOCUMENTS

JP 2004-530899 A 10/2002
JP 2009-258739 A 11/2009
(Continued)

OTHER PUBLICATIONS

Ming-Jun Li et al. "Dual Core Optical Fiber for Distributed Brillouin Fiber Sensors", Asia Communications and Photonics Conference, 2014, pp. 1-3.
(Continued)

*Primary Examiner* — Ellen E Kim
(74) *Attorney, Agent, or Firm* — Volentine, Whitt & Francos, PLLC

(57) ABSTRACT

An optical fiber sensor includes an optical fiber. The optical fiber includes a cladding having a cladding refractive index, and a plurality of fiber cores embedded in the cladding and extending along a longitudinal axis of the optical fiber. The plurality of fiber cores include a first subset of at least one first fiber core and a second subset of at least one second fiber core. The at least one first fiber core has a first core refractive index different from the cladding refractive index and a first core radius in a direction transverse to the longitudinal axis. The at least one second fiber core has a second core refractive index different from the cladding refractive index and a second core radius transverse to the
(Continued)

longitudinal axis. The second core refractive index and the second core radius differ from the first core refractive index and the first core radius such that a temperature sensitivity of the at least one second fiber core differs from the temperature sensitivity of the first fiber core.

20 Claims, 10 Drawing Sheets

(51) Int. Cl.
    *G01B 11/16*     (2006.01)
    *G01H 9/00*     (2006.01)
    *G01L 1/24*     (2006.01)
    *G02B 6/02*     (2006.01)
    *G02B 6/12*     (2006.01)

(52) U.S. Cl.
    CPC .......... *G01L 1/242* (2013.01); *G02B 6/02042* (2013.01); *G02B 6/02076* (2013.01); *G02B 6/02333* (2013.01); *G02B 2006/12138* (2013.01)

(58) Field of Classification Search
    CPC ............ G02B 6/02076; G02B 6/02333; G02B 2006/12138
    See application file for complete search history.

(56) References Cited

U.S. PATENT DOCUMENTS

| | | | |
|---|---|---|---|
| 11,200,929 B1 * | 12/2021 | Van Vaerenbergh | ... G11C 11/42 |
| 2004/0234218 A1 * | 11/2004 | Tao | .................. B29D 11/00721 385/37 |
| 2009/0168149 A1 * | 7/2009 | Petersson | ........... G02B 6/02323 359/339 |
| 2009/0262779 A1 | 10/2009 | Andrejco et al. | |
| 2011/0267612 A1 * | 11/2011 | Roberts | .............. G02B 6/02328 385/124 |
| 2014/0042306 A1 | 2/2014 | Hoover et al. | |
| 2014/0308005 A1 * | 10/2014 | Lee | .................... G02B 6/29334 385/37 |
| 2016/0047976 A1 | 2/2016 | Schade et al. | |
| 2022/0011195 A1 * | 1/2022 | Yaman | ................. G01M 11/331 |

FOREIGN PATENT DOCUMENTS

| | | |
|---|---|---|
| JP | 2015-531861 A | 11/2015 |
| JP | 2016-522882 A | 4/2016 |
| WO | 03001156 A1 | 1/2003 |
| WO | 2016099976 A1 | 6/2016 |
| WO | 2016122742 A2 | 8/2016 |
| WO | 2017/085879 A1 | 5/2017 |
| WO | 2017118949 A1 | 7/2017 |

OTHER PUBLICATIONS

International Search Report dated Oct. 28, 2019, 3 pgs.
Li et al.: "Dual Core Optical Fiber for Distributed Brillouin . . . ", Optical Society of America, 2014/11/11, pp. 1-3.
Japanese Office Action dated Feb. 8, 2022, Cited in JP Application No. 2021-509177.
Japanese office action dated Jun. 21, 2022, Application No. 2021-509177, 4 pgs.
English translation of Japanese Office Action, 5 pgs.
Indian Office Action dated Jul. 6, 2022, Application No. 2021470037, with English Translation, 7 pgs.

* cited by examiner

OPTICAL FIBER SENSOR

CROSS-REFERENCES TO RELATED APPLICATIONS

This is a continuation application of International Patent Application PCT/2019/075334, filed on 20 Sep. 2019 and designating the United States of America, which claims priority from European Patent Application 18195646.7 filed on 20 Sep. 2018, both of which patent applications are hereby incorporated by reference herein.

FIELD OF THE INVENTION

The present invention generally relates to the field of optical fiber sensors. In particular, the present invention relates to an optical fiber sensor which allows separation of a common-mode signal into temperature-induced and strain-induced contributions.

BACKGROUND OF THE INVENTION

An optical fiber sensor may be used in optical shape sensing (OSS) which is a technology with which the three-dimensional shape of a special optical fiber can be reconstructed from the reflections of light within the fiber. This technology enables, for example, real-time 3D visualization of the full shape of devices like medical devices, for example catheters and guide wires. Optical shape sensing allows a physician to navigate medical devices during a procedure without the need of X-ray tracking.

In optical shape sensing, an optical fiber sensor, also referred to as optical shape sensing fiber, is interrogated with light coupled into the fiber cores of the fiber. Distributed strain measurements performed simultaneously on each of the fiber cores of a twisted multicore fiber sensor are used to compute signals corresponding to specific deformations of the optical fiber at every position along the length of the fiber. The distributed strain measurement is performed, for example, with the method of swept-source interferometry, in which the wavelength of a laser, e.g. a single-mode laser, is varied monotonically over a well-defined wavelength range. Each fiber core is in communication with its own interferometer. Usually, fiber Bragg gratings (FBGs) are written into the fiber cores to provide well-defined reflection signals. Conventionally, the optical fiber of an optical fiber sensor comprises four fiber cores, namely a central fiber core and three symmetrically placed outer cores helically wound around the central core. The deformation signals that can be computed from the four fiber core signals represent curvature (bending of the fiber) in two independent directions, torsion (twist) of the fiber, and a signal representing a common-mode effect, i.e. a signal that is common to all cores. A 4×4 matrix is customarily used to compute the deformation signals from the fiber core signals, i.e. the deformation signals are appropriate linear combinations of the four fiber core signals. The two independent curvature components (in units of, e.g., 1/m) and the twist angle (in units of, e.g., radians) are then computed from the corresponding deformation signals by multiplication with appropriate scaling factors that have been determined beforehand in a calibration procedure. The shape of the optical fiber sensor can be reconstructed from the two curvature components and the twist angle, available at every position along the fiber sensor.

The common-mode signal can be the result of elongation of the optical fiber (axis strain), it can be the result of a change of temperature, or it can be the result of a combination of these effects. It has been found empirically that when axial strain or temperature change is applied to the optical fiber sensor, not only the common-mode signal changes, but the twist signal is affected as well. As correct values of the twist angle are essential for the accuracy of the shape reconstruction, the effects of axial strain and/or temperature change on the twist signal must be compensated. It is possible to compensate these effects in the twist signal by subtracting a small fraction of the common-mode signal (or, equivalently, by slightly modifying the 4×4 matrix) to negate the effects of pure axial strain or pure temperature change. However, in general, the required compensation factors are different for axial strain and temperature change. A simple scheme for compensating the twist signal is not available, as proper compensation would require knowledge about the relative contributions of axial strain and temperature effects to the observed total common-mode signal. If these relative contributions were known, the net compensation to the twist signal could be computed by adding the compensations of these separate contributions after combining each contribution with its appropriate compensation factor.

The separation of the common-mode signal into strain-induced and temperature-induced contributions is a well-known problem in optical fiber-based shape sensing. The four fiber core signals of a 'standard' four-core shape sensing fiber do not provide sufficient information. A fifth signal would be required. In shape sensing, this could be accomplished by adding one or more fiber cores to the multicore fiber. The additional fiber cores need to have a different ratio of sensitivity to strain and sensitivity to temperature to allow separation of the common-mode signal into temperature-induced and strain-induced contributions.

WO 2016/099976 A1 and WO 2016/122742 A2 disclose strain-temperature separation in optical fibers by adding one or more fiber cores that have a temperature sensitivity that is different from the temperature sensitivity of the four 'standard' fiber cores. The latter document discloses that temperature sensitivity of the two types of fiber cores should differ by more than 2% for strain-temperature separation to be practical. The different temperature sensitivity for the additional fiber core(s) is achieved by different doping levels in the fiber cores and/or by adding a different doping material to some of the fiber cores. However, what is not considered in these documents is the effect of the additional fiber core(s) on fiber sensor properties other than temperature sensitivity. In other words, the proposed additional fiber cores may show a mix of properties that is less than optimal for shape sensing purposes, especially when temperature sensitivities of the two types of fiber cores are required to differ by at least 2%.

There still is a need for an improved optical fiber sensor design which allows separation between temperature-induced and strain-induced contributions in the common-mode signal without affecting shape sensing accuracy.

SUMMARY OF THE INVENTION

It is an object of the present invention to provide an optical fiber sensor which does not only allow separation of strain and temperature effects, but also allows optimal performance of the sensor for optical shape sensing.

According to an aspect of the invention, an optical fiber sensor for shape sensing is provided, comprising an optical fiber, the optical fiber comprising a cladding having a cladding refractive index, and a number of optical fiber cores embedded in the cladding and extending along a longitudinal axis of the optical fiber, the number of optical fiber cores having a first subset of at least one first fiber core and a second subset of at least one second fiber core, the at least one first fiber core has at least one first Bragg grating, and the at least one second fiber core has at least one second fiber Bragg grating, the at least one first fiber core having a first core refractive index different from the cladding refractive index and a first radius in direction transverse to the longitudinal axis, the at least one second fiber core having a second core refractive index different from the cladding refractive index and a second radius transverse to the longitudinal axis, wherein the second core refractive index and the second radius of the at least one second fiber core differ from the first core refractive index and the first radius.

The optical fiber sensor according to the invention has a first subset (first type) of one or more optical fiber cores and a second subset (second type) of one or more optical fiber cores which differ from the fiber core(s) of the first subset not only in the core-cladding refractive index difference, but also in the core radius. The core radius or half diameter of a fiber core is the radius of the fiber core in direction transverse to the longitudinal direction of the fiber core, i.e. in its cross-section, wherein the radius is taken with respect to the longitudinal center axis of the fiber core. According to the invention, the fiber sensor has two (or more) different fiber core designs, which allow separation of temperature-induced contributions from strain-induced contributions in the common mode signal. As will be described and shown in more detail below, the combination of core-cladding refractive index difference and core radius of the additional fiber core(s) may be chosen such that the optical fiber sensor does not only allow separation of strain and temperature, but also allows optimal performance for optical shape sensing. The combination of core-cladding refractive index difference and core radius of the additional core(s) provides the best balance between temperature sensitivity difference between the fiber core designs of the first and second subsets of optical fiber cores and other properties which are relevant to optical shape sensing. The core refractive index of the at least one fiber core of the second subset may be set by choosing a doping level and/or doping material different from the doping level and/or doping material of the at least one fiber of the first subset. The present invention achieves separation between temperature-induced effects and strain-induced effects without compromising the performance of the optical fiber sensor to accurately sense shape, and thus a 3D shape reconstruction using the optical fiber sensor according to the invention can be more accurate than with standard optical fiber sensors according to the prior art.

Optical properties of the optical fiber sensor which may be relevant for the shape sensing accuracy may be numerical aperture (NA), single-mode behavior, resonance wavelength, group velocity dispersion, bend losses, and others, wherein the afore-mentioned properties are influenced by fiber core refractive index and fiber core radius.

In an embodiment, the second core refractive index and the second radius with respect to the first core refractive index and the first radius may be such that an absolute value of a difference between a first numerical aperture of the at least one first fiber core and a second numerical aperture of the at least one second fiber core is at most 0.03 or in a range from about 0.01 to about 0.03.

Such a numerical aperture (NA) difference between the fiber core designs of the first subset and the second subset allows for a sufficient difference in temperature sensitivity between the two sets of optical fiber cores, while also providing high shape sensing accuracy.

Further, a NA difference between the core designs of the first and second subsets of optical fiber cores at most 0.03 or in a range from 0.01 to 0.03 is suitable to limit the resonance wavelength difference of the wavelength sensitive reflecting structures, e.g. FBGs, of the optical fiber cores. Limiting the difference between the resonance wavelengths of the different core designs of the first subset and the second subset has the advantage that smaller bend radii of the optical fiber sensor can be measured with the optical fiber sensor.

In an embodiment, one fiber core design of the first and second fiber core designs (first and second subsets) may have a lower numerical aperture than the other fiber core design, wherein the lower numerical aperture is at least 0.17.

An NA of at least 0.17 is advantageous in limiting bend losses at very tight bends of the optical fiber sensor.

In an embodiment, the first and/or second core refractive index and the first and/or second fiber core radius may be such that a first and/or second $LP_{11}$-cutoff wavelength of the at least one first and/or second fiber core is below 1500 nm and above 1100 nm.

In these embodiments, the lowest $LP_{11}$-cutoff wavelength may be at least 1100 nm, e.g. 1200 nm. When the optical fiber sensor is optically interrogated in a shape sensing system operating in the C-band (1530 nm-1565 nm), single-mode behavior of the fiber is ensured in this embodiment. Single-mode behavior of the fiber is advantageous in terms of shape sensing performance and accuracy.

In an embodiment, the second core refractive index, the second radius, the first core refractive index and the first radius may be chosen such that a product of a difference between a first numerical aperture of the at least one first fiber core and a second numerical aperture of the at least one second fiber core and a difference between a first $LP_{11}$-cutoff wavelength of the at least one first fiber core and the second $LP_{11}$-cutoff wavelength of the at least one second fiber core has a negative value.

In this embodiment, the fiber core design having the lower NA has an $LP_{11}$-cutoff wavelength that is higher than the $LP_{11}$-cutoff wavelength of the fiber core design having the higher NA. An advantageous effect of this embodiment is that the difference between the resonance wavelengths of the different core designs can be kept small as possible for a given difference in temperature sensitivity so as to accommodate the maximum range of measurable bend radii of the optical fiber sensor.

In an embodiment, the at least one first fiber Bragg grating has a first resonance wavelength when exposed to light in an unstrained state of the fiber core, and the at least one second fiber Bragg grating has a second resonance wavelength when exposed to light in an unstrained state of the fiber core, wherein an absolute value of a difference between the first and the second resonance wavelengths is equal to or less than 3 nm.

The fiber Bragg gratings are wavelength sensitive reflecting structures. With a difference in resonance wavelength between the different core designs in the given range, the range of measurable bend radii remains as large as possible for a given difference in temperature sensitivity. The resonance wavelength of a FBG does not only depend on the geometric grating period, but also on the mode index of the corresponding fiber core which in turn depends on the numerical aperture of the fiber core and the fiber core radius. Thus, appropriate differences in resonance wavelength between the different core designs can be adjusted by appropriately choosing the mode indices of the core designs which in turn depend on the fiber core-cladding refractive index differences and fiber core radii.

In an embodiment, the two fiber core designs of the first and second subsets of optical fiber cores may have sensitivities to UV radiation which are as similar as possible, or in other words do not deviate from each other substantially. An advantage is that when inscribing the wavelength dependent reflective structures into the optical fiber cores of the first and second subsets, the resulting structures, e.g. FBGs, can be made with sufficient strength.

In an embodiment, the second temperature sensitivity differs from the first temperature sensitivity by an absolute value in a range from 0.5% to 2%.

A temperature sensitivity difference in the given range is advantageous that other properties of the optical fiber cores than temperature sensitivity difference which are relevant to the accuracy of shape sensing as well can be better controlled than with temperature sensitivity differences which are above this range, as for example the temperature sensitivity differences proposed in the prior art.

In an embodiment, the first and/or second core refractive index and the first and/or second radius are chosen such that a first and/or second group velocity dispersion of the at least one first and/or second fiber core is in a range from 7 ps/nm/km to 20 ps/nm/km.

When using an auxiliary interferometer to linearize the laser scan which is built with a standard single-mode fiber (SMF 28) a difference in dispersion between the optical fiber of the optical fiber sensor and the auxiliary interferometer should be as small as possible. An increasing difference in dispersion between the optical fiber sensor and the auxiliary interferometer may give rise to systematic errors which can affect the accuracy of optical shape sensing. Thus, the optical fiber sensor according to this embodiment is best adapted for use in a shape sensing console having an auxiliary interferometer built with a standard single-mode fiber (SMF 28) which has a group velocity dispersion of about 17 ps/nm/km.

In a further embodiment, the first core refractive index and the first core radius are chosen such that the at least one first fiber core has a mode field diameter in a range from 6 to 7 µm, and/or the second core refractive index and the second core radius are chosen such that the at least one second fiber core has a mode field diameter in a range from 6 to 7 µm.

A large mode field diameter is advantageous in reducing losses at optical connectors, e.g. for connecting two fiber sensors to one another.

The at least first fiber core and the at least one second fiber core may comprise a dopant, a concentration and/or material of which differs between the at least one first fiber core and the at least one second fiber core.

In an embodiment, the dopant is $GeO_2$.

Further, the cladding of the optical fiber may comprise $SiO_2$.

Preferably, the first subset of optical fiber cores has a plurality of optical fiber cores, e.g. 4 optical fiber cores, with one central core and two or more, e.g. three outer cores, and the second subset of optical fiber cores has one, two, three or more outer optical fiber cores. The fiber core(s) of the second subset differ(s) from the optical fiber cores of the first subset in terms of core refractive index and core radius. The first core refractive index and core radius of the first optical fiber cores of the first subset may be equal for all first optical fiber cores. The second core refractive index and core radius of the second optical fiber cores of the second subset may be equal for all second optical fiber cores. Manufacturing of the fiber sensor is thus facilitated. The optical fiber cores of the second subset may only include outer optical fiber cores, while the first subset may have outer cores and one central core. The optical fiber cores of the second subset and the outer cores of the first subset may be arranged alternatingly with respect to one another.

It is to be understood that all embodiments described above can be combined with one another in order to provide an optical fiber sensor allowing, in a shape sensing procedure, for separating temperature-induced effects from strain-induced effects while providing an optimum accuracy in optical shape sensing.

BRIEF DESCRIPTION OF THE DRAWINGS

These and other aspects of the invention will be apparent from and elucidated with reference to the embodiment(s) described hereinafter. In the following drawings

DETAILED DESCRIPTION OF THE INVENTION

Figure 1:
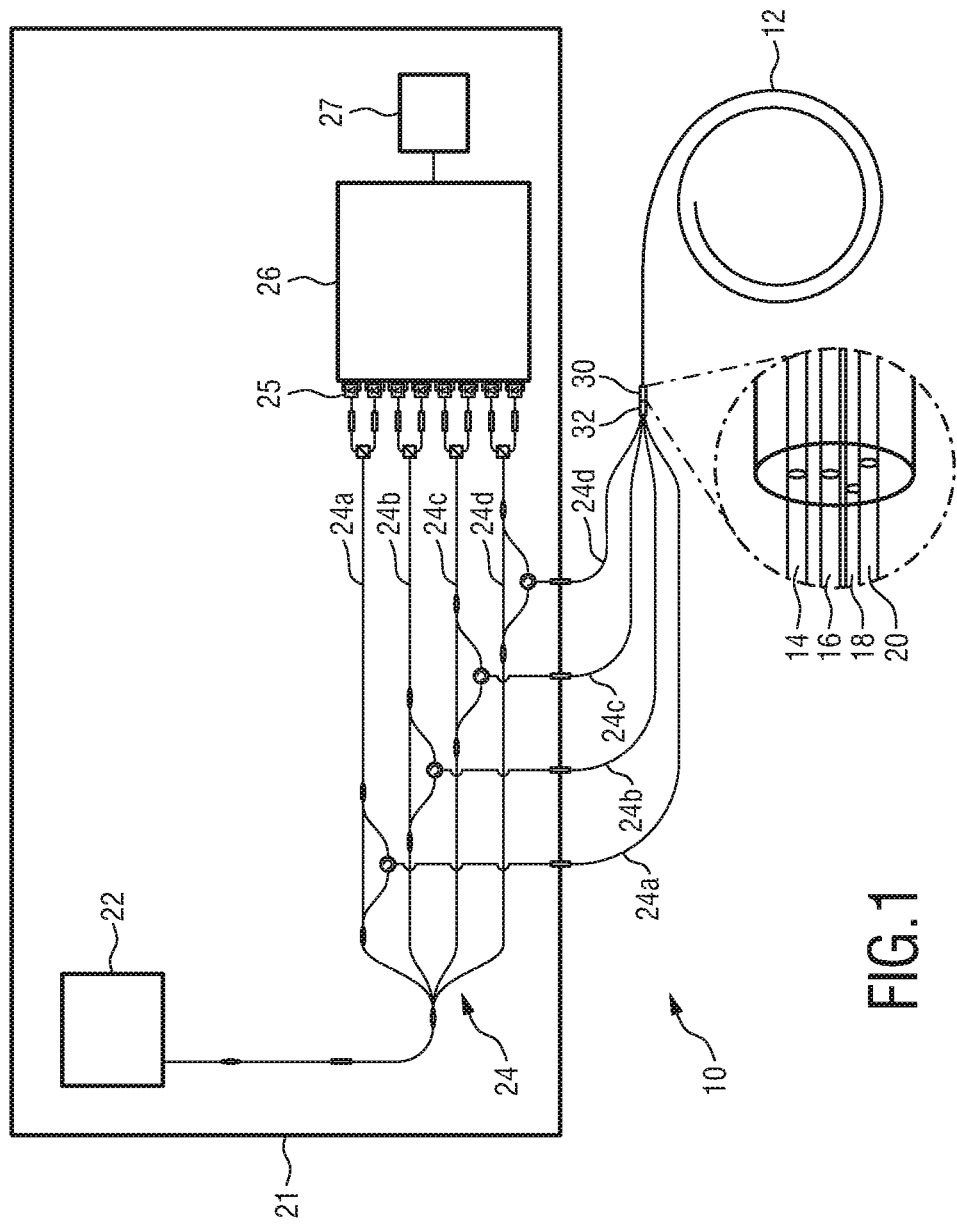
FIG. 1 shows a block diagram illustrating an example of an optical shape sensing system.
Figure 2:
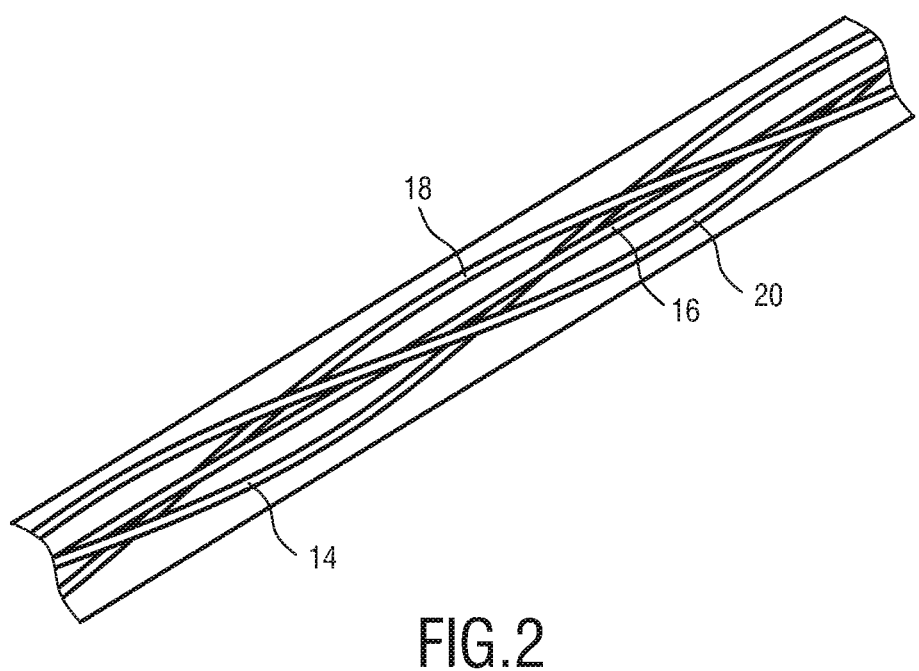
FIG. 2 shows a perspective view of an example of a standard optical fiber sensor.

FIG. 1 schematically shows parts of an optical fiber shape sensing system 10 configured as a multi-channel optical frequency domain reflectometry (OFDR)-based and distributed-strain sensing system for sensing an optical fiber sensor 12. The optical fiber sensor 12 comprises an optical fiber having a cladding and embedded therein a plurality of optical fiber cores, in the present example four cores with one center optical fiber core 16 and three outer optical fiber cores 14, 18, 20 (hereinafter sometimes referred to as "optical fiber cores 14, 16, 18, 20"). The optical fiber sensor shown in FIG. 1 is a standard fiber sensor. It is to be noted here that the present invention proposes optical fiber sensor designs having more than four optical fiber cores. FIG. 2 shows a piece of length of the optical fiber cores 14, 16, 18, 20 with the outer optical fiber cores 14, 18, 20 radially spaced apart from and spiraled around the one center optical fiber core 16. The one center optical fiber core 16 is arranged on the center axis of the optical fiber sensor. The outer optical fiber cores 14, 18, 20 are angularly spaced with respect to one another in azimuthal direction around the longitudinal center axis of the optical fiber sensor 12. According to a number of three outer optical fiber cores in the present example, the angular spacing between neighboring outer cores may be 120°.

With reference again to FIG. 1, the optical fiber shape sensing system 10 comprises an interrogator unit 21. The interrogator unit 21 may comprise a tunable light source 22 which can be swept through a range of optical frequencies, also referred to as scan range. The light emitted by the tunable light source 22 is coupled into an optical interferometric network 24 having optical channels 24a, 24b, 24c, 24d according to the number of optical fiber cores of the optical fiber sensor 12. In case the optical fiber sensor 12 has more than four cores, the optical interferometric network 24 may have a corresponding number of more than four optical channels. Each channel forms an interferometer for one of the optical fiber cores.

When the tunable light source 22 is swept through a range of optical frequencies, each optical channel 24a, 24b, 24c, 24d and thus each optical fiber core 14, 16, 18, 20 of the optical fiber sensor 12 is simultaneously and independently optically interrogated, and the interference signal created by the light returning from each of the optical fiber cores 14, 16, 18, 20 is routed to a processing unit or data acquisition unit 26 via respective photodetectors 25. The distributed strain measurement from the optical fiber cores 14, 16, 18, 20 using the multiple channel OFDR system may then be exported to a unit 27 for further processing, in particular for three-dimensional shape reconstruction of the optical fiber sensor 12 and, for example, for visual display of the reconstructed three-dimensional optical fiber sensor 12.

optical fiber cores 14, 16, 18, 20 may have fiber Bragg gratings (FBGs) as wavelength sensitive reflective structures (not shown) formed by periodic variations in the refractive index along the optical fiber cores. An FBG reflects light of a certain wavelength (also referred to as resonance wavelength), and transmits all other wavelengths. In the present description, optical fiber cores with FBGs are considered that have a single resonance frequency (or wavelength) along the length of the corresponding fiber core. When a local bend is imparted on the optical fiber sensor 12, the resonance wavelength is shifted (decreased or increased) by strain, and measurement of the reflected wavelength for any position along the fiber allows determining the local strain.

Figure 3A:
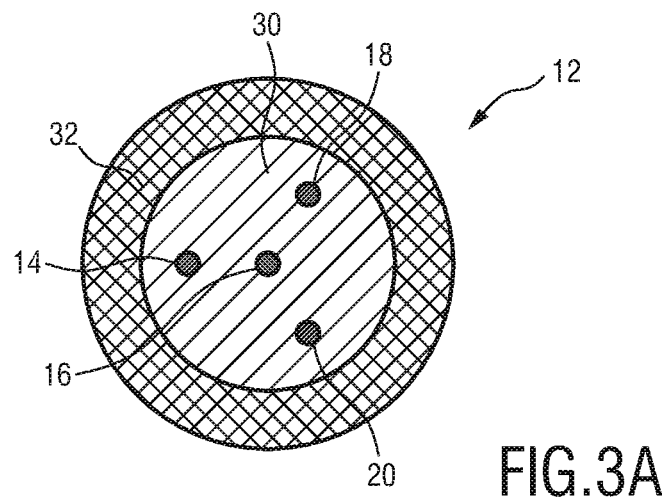
FIG. 3A shows a cross-section of a standard optical fiber sensor.

FIG. 3A shows a cross-section of the standard optical fiber sensor 12 in FIG. 2. The optical fiber of the optical fiber sensor 12 has the optical fiber cores 14, 16, 18, 20, and a cladding 30 in which the optical fiber cores 14, 16, 18, 20 are embedded. A coating 32 may enclose the cladding 30. When using a four fiber core optical fiber sensor like optical fiber sensor 12, deformation signals that can be computed from the four fiber core signals represent curvature (bending of the fiber) in two independent directions, torsion (twist) of the optical fiber sensor 12, and a signal representing a common-mode effect, i.e. a signal that is common to all optical fiber cores. The common-mode signal can be the result of elongation of the fiber (axial strain), it can be the result of a change of temperature, or it can be the result of a combination of these effects. The common-mode signal also affects the twist signal. Correct values of the twist angle are essential for the accuracy of the reconstructed shape. Therefore, the effects of axial strain and/or temperature change on the twist signal must be compensated. Such compensation requires knowledge about the relative contributions of axial strain and temperature effects to the observed total common-mode signal. A 4-fiber core fiber sensor does not provide sufficient information for separating the common-mode signal into strain-induced and temperature-induced contributions.

Figure 3B:
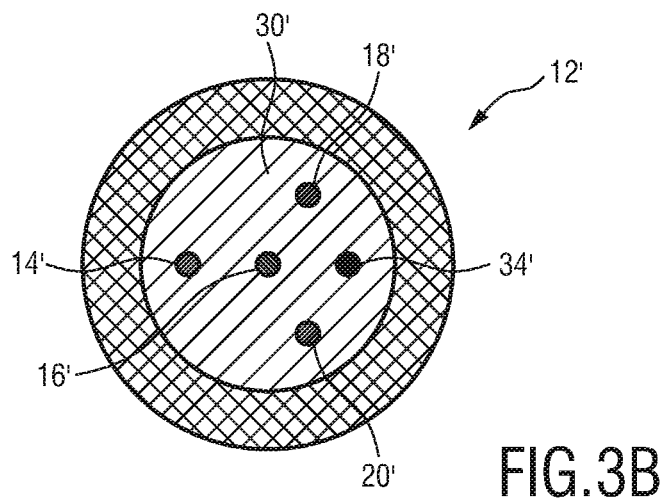
FIG. 3B shows a cross-section of an optical fiber sensor having an additional fiber core according to the principles of the present invention.

The present invention therefore provides an optical fiber sensor 12' as shown in FIG. 3B comprising an optical fiber having a cladding 30', a first subset of optical fiber cores 14', 16', 18', 20' and a second subset of at least one fiber core 34'. The cladding 30' has a cladding refractive index. The optical fiber cores 14', 16', 18', 20', and 34' are embedded in the cladding 30' and extend along a longitudinal axis of the optical fiber. The at least one optical fiber core 34' has a core refractive index different from the cladding refractive index and a first radius (half diameter) in cross-section transverse to the longitudinal axis, the optical fiber cores 14', 16', 18', 20' have a core refractive index different from the cladding refractive index and a radius transverse to the longitudinal axis. The core refractive index and the radius (half diameter) of the at least one fiber core 34' differ from the core refractive indices and the radii of the optical fiber cores 14', 16', 18', 20' such that a temperature sensitivity of the at least one fiber core 34' differs from the temperature sensitivity of the optical fiber cores 14', 16', 18', 20' which allows a separation between strain effects and temperature effects on the common-mode signal. The core refractive indices of the optical fiber cores 14', 16', 18', 20' may be the same among the optical fiber cores 14', 16', 18', 20'.

In the present embodiment, the different core refractive index of the at least one fiber core 34' with respect to the optical fiber cores 14', 16', 18', 20' may be obtained by a different dopant concentration and/or dopant material in the at least one fiber core 34' with respect to the optical fiber cores 14', 16', 18', 20'. As an example, the optical fiber cores 14', 16', 18', 20' and the at least one fiber core 34' may be germanium-doped optical fiber cores, wherein the germanium concentration in the at least one fiber core 34' differs from the germanium concentration in the optical fiber cores 14', 16', 18', 20'. The optical fiber cores 14', 16', 18', 20', and

34' may be made of silica doped with $GeO_2$. Other dopant materials are possible. The cladding 30' may be made of silica ($SiO_2$).

While the five fiber core design of the optical fiber sensor 12' in FIG. 3B allows the separation of temperature and strain effects, it may not be optimal in terms of accuracy of shape sensing. Therefore, a more symmetrical design of an optical fiber sensor 12" is preferred in the present invention, wherein the second subset of optical fiber cores includes three optical fiber cores 34", 36" and 38" in addition to the first subset of optical fiber cores 14", 16", 18" and 20". The optical fiber cores 34", 36", 38" of the second subset of optical fiber cores differ from the optical fiber cores 14", 16", 18", 20" of the first subset of optical fiber cores in terms of core refractive index and radius (diameter) in cross-section as described above with respect to FIG. 3B. The optical fiber cores 34", 36", 38" and the optical fiber cores 14", 18", 20" may have an equal radial distance from the center core 16" and may be helically wound around the latter. The angular separation in azimuthal direction around the center core 16" between two neighboring optical fiber cores of the optical fiber cores 34", 36", 38", 14", 18", 20" may be 60° in a full symmetrical arrangement. The outer optical fiber cores of the first subset and the optical fiber cores of the second subset may be arranged alternatingly. For example, the optical fiber cores 14", 18", 20" may be arranged at positions 0°, 120°, 240°, and the optical fiber cores 34", 36", 38" at positions 60°, 180°, and 300° around the center core.

In the following, optimized fiber core design combinations of the first and second subsets of optical fiber cores of the optical fiber sensor 12" will be described. For example, the optical fiber cores 14", 16", 18", 20" may be configured according to a first fiber core design, and the (additional) optical fiber cores 34", 36", 38" may be configured according to a second fiber core design. The optical fiber cores within one of the first and second subsets may have equal properties. The following considerations are based on a cladding 30" made of silica and step-index germanium-doped optical fiber cores 14", 16", 18", 20", 34", 36", 38", used in a shape sensing system like optical fiber shape sensing system 10 operating in the C-band (1530-1565 nm). Model computations that will be shown in the following figures have been performed for a wavelength of 1545 nm. optical fiber cores, the differences between step-index optical fiber cores are the result of fiber core radius differences and fiber core refractive index differences, the latter being the result of differences in, for example, doping level (e.g. germanium concentration). The two parameters, namely fiber core radius and doping level suffice to specify a fiber core design. Alternatively, it is also possible to use different independent parameters that uniquely depend on fiber core radius and doping level to specify a fiber core design. Two such parameters are the numerical aperture (NA) and the $LP_{11}$-cutoff wavelength $\lambda_{LP11}$.

The numerical aperture is related to the refractive indices of fiber core and cladding by the relation $$NA = \sqrt{n_{core}^2 - n_{clad}^2} \quad (1)$$

Figure 4:
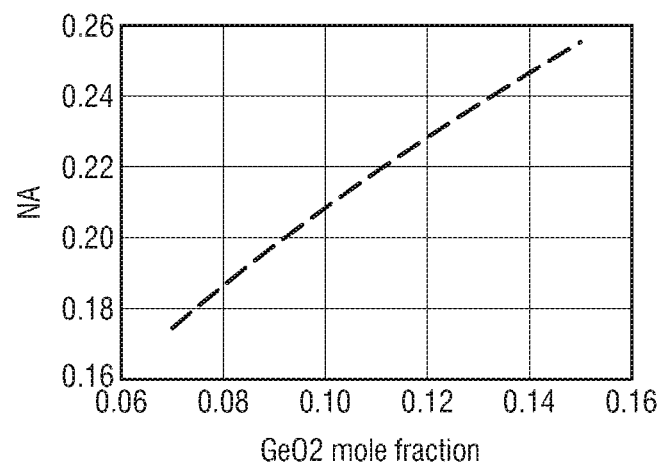
FIG. 4 shows a diagram illustrating numerical aperture as function of a dopant concentration in a fiber core.

FIG. 4 shows the relation between numerical aperture (NA) and germanium concentration of the fiber core. NA increases with increasing dopant concentration as shown in FIG. 4.

The $LP_{11}$-cutoff wavelength $\lambda_{LP11}$ is the minimum wavelength at which the optical fiber still acts as a single mode fiber. Above the $LP_{11}$-cutoff wavelength, the fiber will only allow the $LP_{01}$ mode to propagate through the fiber sensor. Below the $LP_{11}$-cutoff wavelength, higher order modes, i.e. $LP_{11}$, $LP_{21}$, $LP_{02}$, etc. will be able to propagate. A single-mode behavior of the optical fiber sensor 12 is preferable in terms of performance in shape sensing modalities. Therefore, the wavelength range in which an optical fiber sensor is used should be at wavelengths longer than the $LP_{11}$-cutoff wavelength. For weakly guiding step-index fibers, the theoretical $LP_{11}$-cutoff wavelength is related to the numerical aperture NA and the core radius a by $$\lambda_{LP11} \approx \frac{2\pi}{2.4048} \cdot a \cdot NA \quad (2)$$

The constant 2.4048 is the first zero of the Bessel function $J_0$. Note that when $\lambda_{LP11}$ is expressed in nm and a is expressed in μm, an additional numerical factor of 1000 will be required in equation (2).

Figure 5:
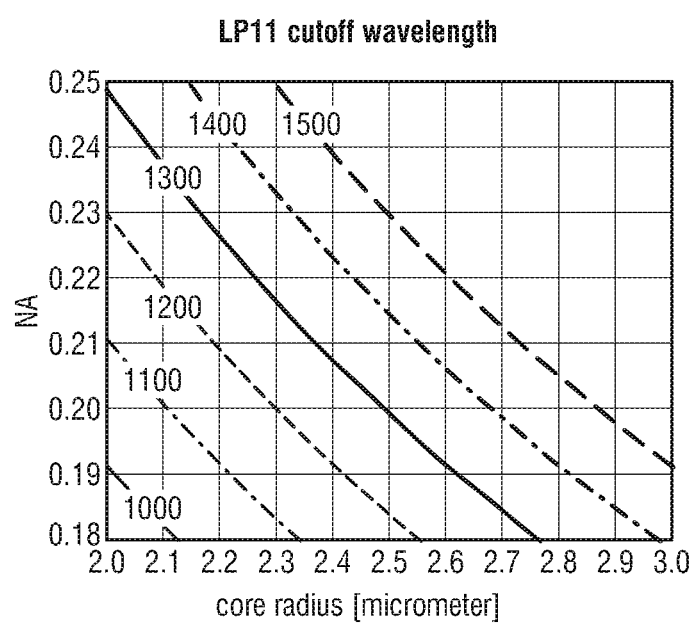
FIG. 5 shows a diagram illustrating numerical aperture as a function of fiber core radius for different $LP_{11}$-cutoff wavelengths.

Contour lines of constant $LP_{11}$-cutoff wavelengths are plotted in FIG. 5, with fiber core radius and numerical aperture NA along the x-axis and y-axis, respectively. The numbers in the diagram in FIG. 5 indicate the cutoff wavelength $\lambda_{LP11}$ in nm to which each contour line corresponds.

In the following, temperature and strain sensitivities of fiber core designs are explored. In order to be able to do so, temperature and strain sensitivities have to be defined first. The phases obtained from the interferometer signals in an optical shape sensing measurement change in proportion to changes of optical path length, where the optical path length of a section of a single-mode fiber is defined as the product of the geometrical length of that section and the mode index $n_{mode}$ of the optical fiber in that section. Temperature sensitivity may therefore be defined as the change of optical path length per unit length per degree of temperature change, while strain sensitivity may be defined as change of optical path length per unit length per unit strain.

From the above definitions, the temperature sensitivity is given by equation (3):

$$\text{temperature sensitivity} = \frac{\Delta(n_{mode} \cdot l)}{l \cdot \Delta T} \quad (3)$$

$$= \frac{l \Delta n_{mode} + n_{mode} \Delta l}{l \Delta T}$$

$$= \frac{l \frac{dn_{mode}}{dT} \Delta T + n_{mode} \alpha l \Delta T}{l \Delta T}$$

$$= \frac{dn_{mode}}{dT} + \alpha n_{mode}$$

where T denotes temperature and α is the coefficient of thermal expansion of the optical fiber. In the present example, the thermal expansion of the silica cladding material is taken, as the contribution of the optical fiber cores to the cross-sectional area of the optical fiber is small.

The strain sensitivity is given by equation (4):

$$\text{strain sensitivity} = \frac{\Delta(n_{mode} \cdot l)}{l \cdot \epsilon} \quad (4)$$

$$= \frac{l \Delta n_{mode} + n_{mode} \Delta l}{l \epsilon}$$

-continued $$= \frac{l\frac{dn_{mode}}{d\epsilon}\epsilon + n_{mode}\epsilon l}{l\epsilon}$$

$$= \frac{dn_{mode}}{d\epsilon} + n_{mode}$$

where $\epsilon$ is the strain (relative elongation $\Delta$ l/l).

It can be seen from equations (3) and (4) that for a comparison of temperature and strain sensitivities of different core designs not only the mode index $n_{mode}$ has to be computed, but also the change of mode index with temperature, i.e. $dn_{mode}/dT$, and the change mode. of mode index with strain, i.e. $dn_{mode}/d\epsilon$, for the fiber core designs under consideration. For a chosen wavelength, the mode index $n_{mode}$ is determined by the cladding refractive index $n_{clad}$, the core-cladding refractive index step $\Delta n = n_{core} - n_{clad}$ and the fiber core radius a. Changes of the mode index $n_{mode}$ with temperature and strain can thus be written as the sum of contributions resulting from changes to the refractive index-determining parameters:

$$\frac{dn_{mode}}{dT} = \frac{\partial n_{mode}}{\partial n_{clad}} \cdot \frac{dn_{clad}}{dT} + \frac{\partial n_{mode}}{\partial (\Delta n)} \cdot \frac{d(\Delta n)}{dT} + \frac{\partial n_{mode}}{\partial a} \cdot \frac{da}{dT} \quad (5)$$

$$\frac{dn_{mode}}{d\epsilon} = \frac{\partial n_{mode}}{\partial n_{clad}} \cdot \frac{dn_{clad}}{d\epsilon} + \frac{\partial n_{mode}}{\partial (\Delta n)} \cdot \frac{d(\Delta n)}{d\epsilon} + \frac{\partial n_{mode}}{\partial a} \cdot \frac{da}{d\epsilon} \quad (6)$$

How to numerically compute the mode index $n_{mode}$ for a given fiber core design is known to those skilled in the art. The derivatives of the mode index $n_{mode}$ with respect to fiber core design parameters can be approximated numerically from mode index computations at slightly differing parameter values. The response of the cladding refractive index to temperature and strain, i.e. $dn_{clad}/dT$, and $dn_{clad}/d\epsilon$, as well as the change of fiber core radius with temperature and strain, i.e. $da/dT$ and $da/d\epsilon$, are known. To compute the change of refractive index step with strain, it is assumed that the elasto-optic coefficients of the doped fiber core material are the same as those of the cladding (in the present example silica). For the computation of the change of refractive index step with temperature, it has to be taken into account that the thermal expansion coefficient of doped fiber core material is different from the thermal expansion of the cladding material (silica in the present example), which leads to thermal stresses and strains in the optical fiber of the fiber sensor that effectively change the refractive index step through the elasto-optic effect. The thermal expansion difference, and thus the change in refractive index step with temperature, depends on the doping level of the fiber core.

The net temperature sensitivity is obtained by combining equations (3) and (5):

temperature sensitivity = (7)

$$\frac{\partial n_{mode}}{\partial n_{clad}} \cdot \frac{dn_{clad}}{dT} + \frac{\partial n_{mode}}{\partial (\Delta n)} \cdot \frac{d(\Delta n)}{dT} + \frac{\partial n_{mode}}{\partial a} \cdot \frac{da}{dT} + \alpha n_{mode}$$

Figure 6:
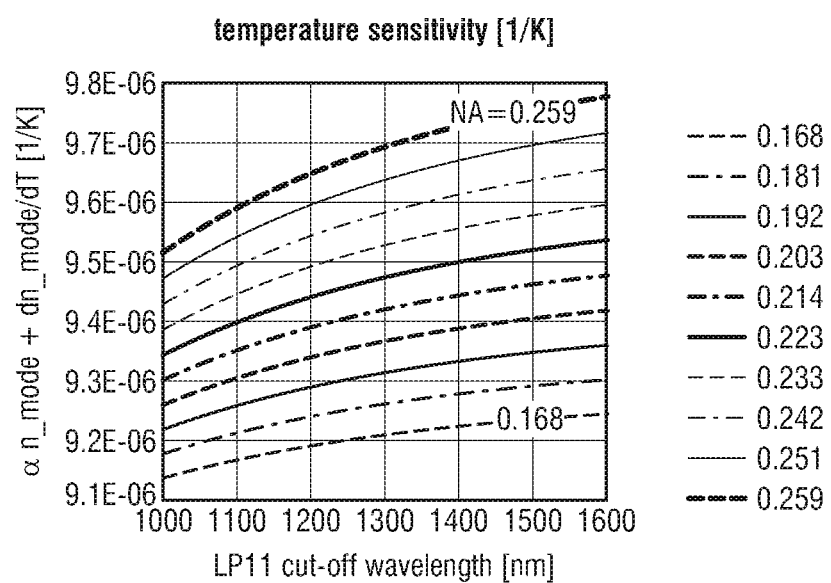
FIG. 6 shows a diagram illustrating temperature sensitivity as function of $LP_{11}$-cutoff wavelengths for several fiber core designs having different numerical apertures.

The results of computations of the temperature sensitivity for a range of fiber core designs are shown in FIG. 6. FIG. 6 shows the temperature sensitivity (y-axis) as function of $LP_{11}$ cutoff wavelength for fiber core designs with different numerical apertures NA. It can be seen that the variation of the temperature sensitivity over the range of fiber core designs considered is of the order of 6%. It will be shown later that the full temperature sensitivity range is not available for practical designs of multicore optical fiber sensors for strain-temperature separation when other properties relevant to the performance of the fiber sensor in shape sensing applications are taken into account.

Figure 7:
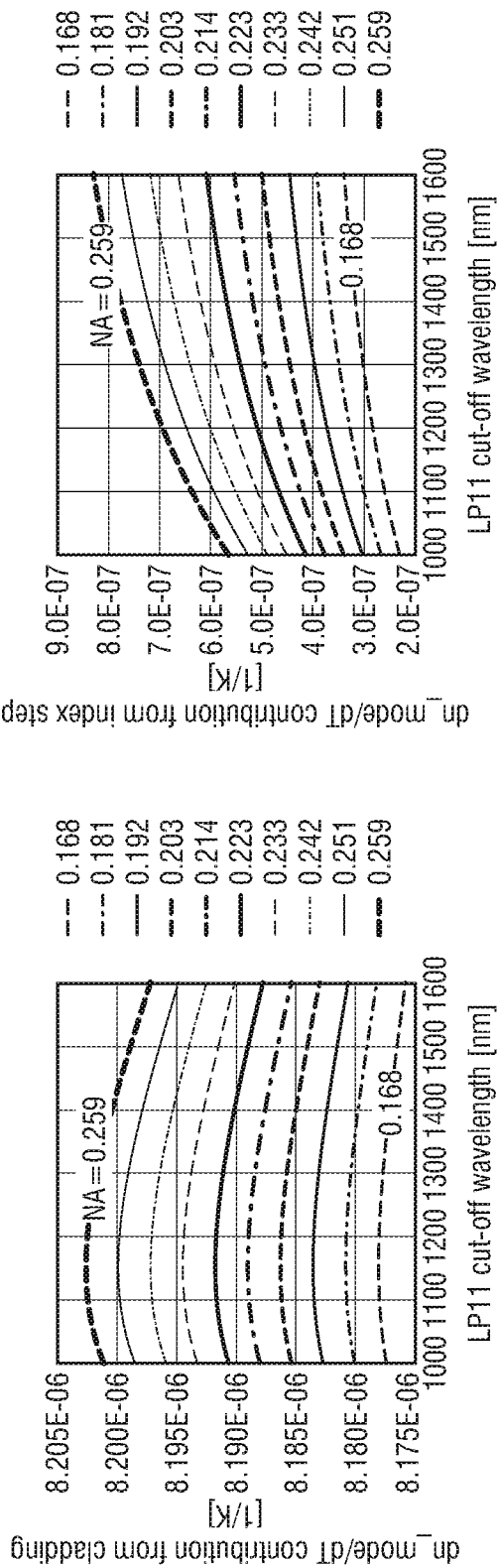
FIG. 7 shows diagrams of single contributions to temperature sensitivity in FIG. 6, wherein the top left diagram shows the contribution to temperature sensitivity from the cladding of the optical fiber, the top right diagram shows the contribution to temperature sensitivity from the index step from fiber core to cladding, the bottom left diagram shows the contribution to temperature sensitivity from fiber core radius, and the bottom right diagram shows the contribution to temperature sensitivity from thermal expansion.
Figure 7:
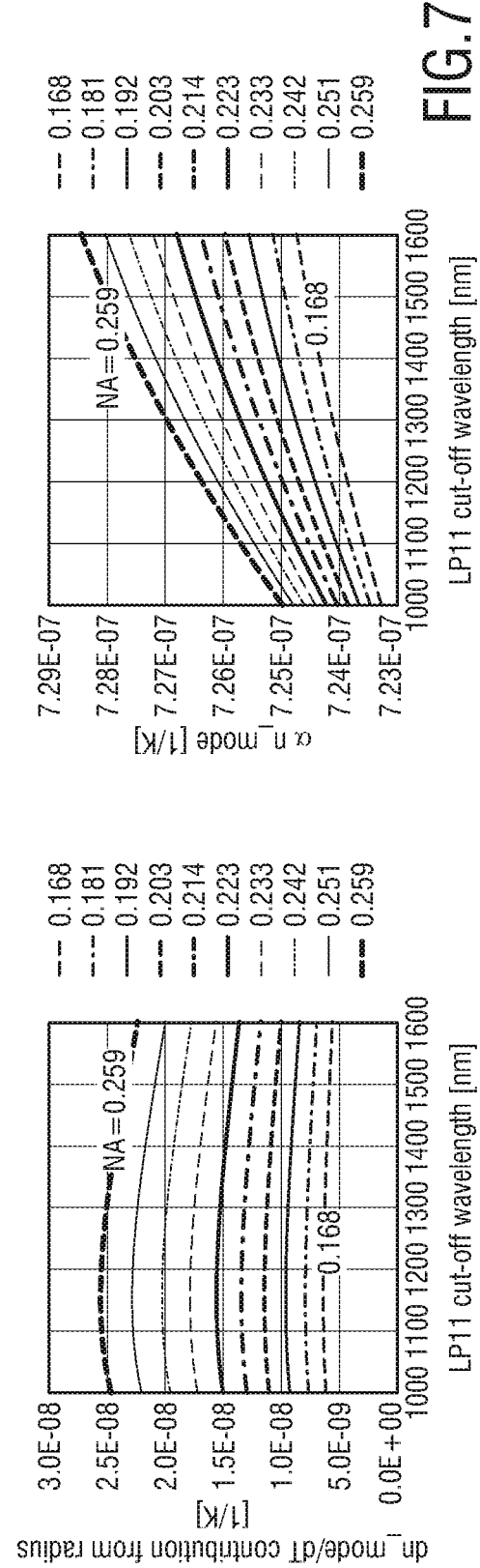

FIG. 7 shows four diagrams, wherein each diagram corresponds to one of the terms on the right side of equation (7). The top left diagram (first term in equation (7)) shows the contribution to temperature sensitivity from the cladding, the top right diagram (second term in equation (7)) shows the contribution to temperature sensitivity from the refractive index step (fiber core to cladding), the bottom left diagram (third term in equation (7)) shows the contribution to temperature sensitivity from fiber core radius, and the bottom right diagram shows the contribution to temperature sensitivity from the last term in equation (7). Note the large differences in the vertical scale ranges of the diagrams. An inspection of the separate contributions to temperature sensitivity as shown in FIG. 7 reveals that the temperature dependence of the cladding index (top left diagram in FIG. 7) is the main contributor to the average net temperature sensitivity, but that the differences between fiber core designs are primarily caused by the temperature dependence of the core-cladding refractive index difference (top right diagram in FIG. 7). Thus, while the temperature dependent refractive index of the cladding causes the bulk (>90%) of the thermal sensitivity of a fiber core, it is the variation of the fiber core-cladding refractive index difference with temperature that is responsible for the dependence of thermal sensitivity on fiber core design.

The net strain sensitivity may be obtained by combining equations (4) and (6):

strain sensitivity = (8)

$$\frac{\partial n_{mode}}{\partial n_{clad}} \cdot \frac{dn_{clad}}{d\epsilon} + \frac{\partial n_{mode}}{\partial (\Delta n)} \cdot \frac{d(\Delta n)}{d\epsilon} + \frac{\partial n_{mode}}{\partial a} \cdot \frac{da}{d\epsilon} + n_{mode}$$

Figure 8:
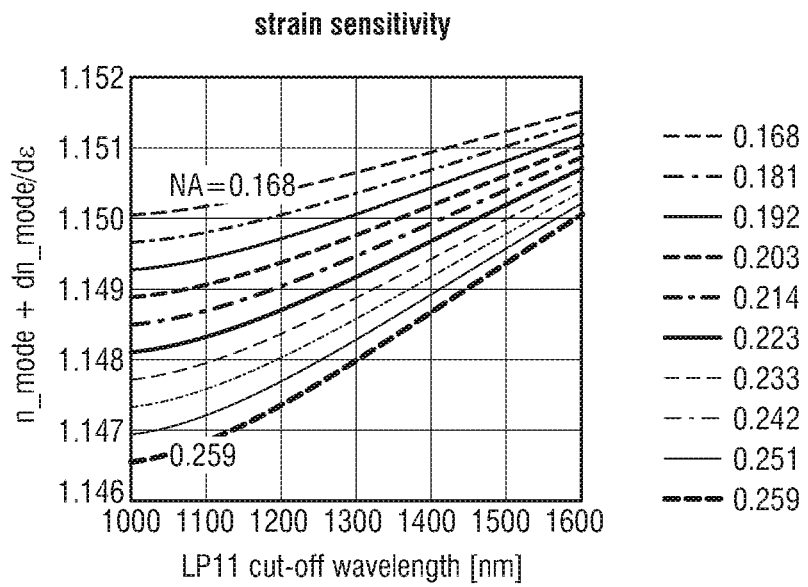
FIG. 8 shows a diagram illustrating strain sensitivity as function of $LP_{11}$-cutoff wavelength for several fiber core designs having different numerical apertures.

The results of computations for a range of fiber core designs is shown in FIG. 8. It can be seen from FIG. 8 that the variation of the strain sensitivity over the range of fiber core designs considered is only of the order of 0.5%, i.e. considerably smaller than the variation of temperature sensitivity between the considered fiber core designs. To achieve separation of temperature and strain, it is needed to select fiber core designs that differ in temperature sensitivity, as the difference in strain sensitivity will not be large enough.

However, it would not lead to optimal results if fiber core designs are selected that just have the largest temperature sensitivity difference. In contrast, there is a need to consider other properties of fiber core designs that are relevant to shape sensing as well. In the following, the requirements posed by these other fiber core properties will be explored.

One of these properties may be the behavior of the optical fiber cores with respect to mode propagation. Single-mode propagation is advantageous over multi-mode propagation. For a shape sensing system operating in the C-band (1530-1565 nm) this means that the $LP_{11}$-cutoff wavelength of the optical fiber cores should be below 1530 nm, preferably below 1500 nm.

Another property which is relevant for an optimized fiber core design for shape sensing purposes is the resonance wavelength of the wavelength sensitive reflective structures of the optical fiber cores. Preferentially, each fiber core of the optical fiber sensor has one or more fiber Bragg gratings (FBGs) that are written on the optical fiber during the fiber manufacturing process. The FBGs may have essentially the same geometric period $\Lambda_B$ on each fiber core, as they result from exposure to a spatially varying UV intensity pattern that is common to all optical fiber cores. Even in the unstrained state of the optical fiber sensor, the resonance wavelength $\lambda_{res}$ of the fiber Bragg gratings can be different for optical fiber cores that do not have the same mode index $n_{mode}$, as the resonance wavelength depends not only on the geometric period $\Lambda_B$ but also on the mode index $n_{mode}$, according to $$\lambda_{res}=2n_{mode}\Lambda_B \quad (9)$$

When an outer fiber core (like optical fiber cores 34" or 36" or 38") experiences strain, e.g. due to bending of the optical fiber sensor 12", its resonance wavelength shifts. When the strain experienced is too large, the resonance wavelength will shift out of the laser scan range and bend strain sensing breaks down as no signal will then be detected. To accommodate the maximum range of bend radii, the resonance wavelength of the cores in the unstrained reference state should be chosen close to the center wavelength of the scan wavelength range. When optical fiber cores have different resonance wavelengths, the strain level at which the resonance of one of the optical fiber cores shifts out of the scan wavelength range will be smaller, leading to a loss of range of measurable bend radii. The effect can be mitigated by increasing the scan range, but that leads to larger amounts of data that need to be processed. It is, therefore, advantageous to have fiber core designs having mode indices that provide as small a difference in resonance wavelength as possible for a given and sufficient difference in temperature sensitivity.

Figure 3C:
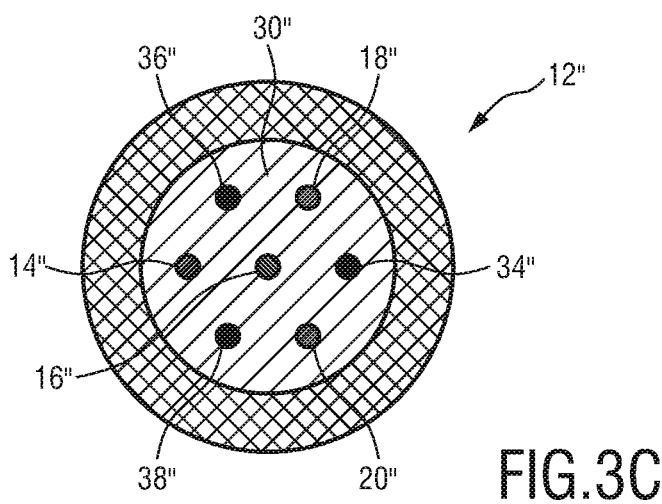
FIG. 3C shows a cross-section of an optical fiber sensor having three additional optical fiber cores according to the principles of the present invention.
Figure 9:
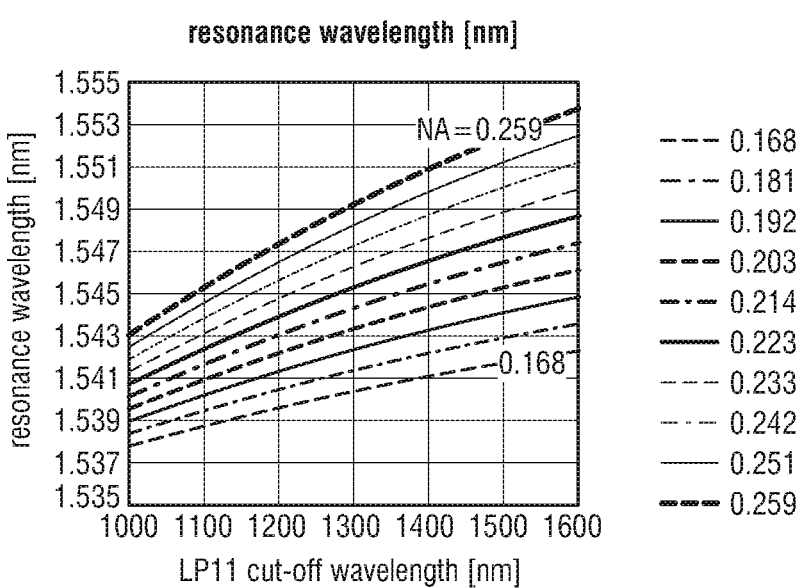
FIG. 9 shows a diagram illustrating resonance wavelength as a function of $LP_{11}$-cutoff wavelength for several fiber core designs having different numerical apertures.
Figure 10:
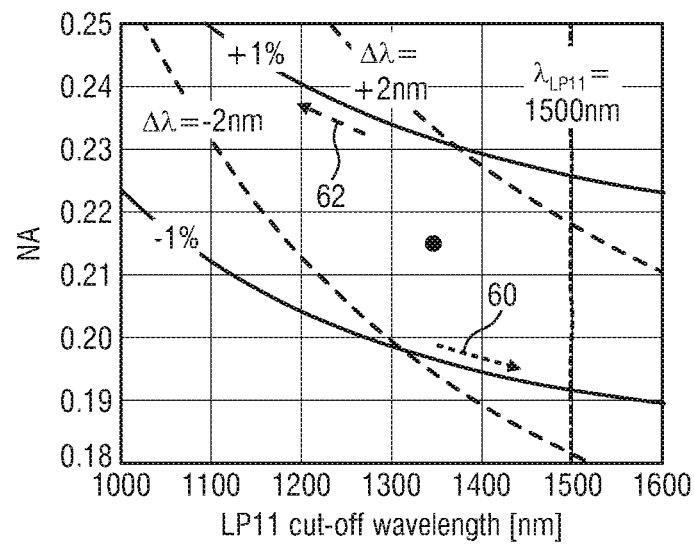
FIG. 10 shows a diagram illustrating contour lines of temperature sensitivity (solid lines) of two example second fiber core designs differing by ±1% from a reference first fiber core design (circular marker) as well as contour lines of resonance wavelengths (broken lines) of the two second fiber core designs differing by ±2 nm from the reference design.

FIG. 9 shows a diagram of resonance wavelengths computed for a range of fiber core designs having different numerical apertures NA as function of $LP_{11}$-cutoff wavelength. The Bragg period $\Lambda_B$ was chosen in such a manner that the resonance wavelength was 1545 nm for a "reference" fiber core design with a numerical aperture equal to 0.215 and a fiber core radius of 2.4 μm, resulting in an $LP_{11}$-cutoff wavelength of 1346 nm.

optical fiber cores 14', 16', 18', 20' in FIG. 3B or the optical fiber cores 14", 16", 18", 20" in FIG. 3C (first subset of optical fiber cores) the second fiber core design, e.g. of the at least one fiber core 34' in FIG. 3B or 34", 36", 38" in FIG. 3C (second subset of optical fiber cores) should be chosen to minimize the resonance wavelength difference for a given temperature sensitivity difference. In order to simplify the comparison, some of the temperature sensitivity data of FIG. 6 and the resonance wavelength data of FIG. 9 are plotted as contour lines in a fiber core design diagram in FIG. 10. FIG. 10 shows contour lines for two second fiber core designs having temperature sensitivity differences of ±1% (solid lines) with respect to a first (reference) fiber core design, and contour lines for two second fiber core designs having resonance wavelength differences of ±2 nm (dashed lines) with respect to the first (reference) fiber core design (indicated by the circular marker in FIG. 10). The diagram in FIG. 10 can be used to explain how a pair of fiber core designs can be improved. As an example, if the second fiber core design of fiber core(s) of the second subset of optical fiber cores would be chosen to have a −1% different temperature sensitivity as compared to the first (reference) fiber core design of optical fiber cores of the first subset of optical fiber cores, it can be seen that the (absolute value) of the resonance wavelength difference could be lowered if one moves along the −1% line to the right in the direction of the arrow 60. Alternatively, if one would choose the second fiber core design to have not a −1%, but a +1% different temperature sensitivity in comparison with the first fiber core design, one could lower the resonance wavelength difference by moving along the +1% line to the left, along the arrow 62. It can be concluded from FIG. 10 that for a pair of fiber core designs (first (reference) and one of the second fiber core designs above) that are meant to differ in temperature sensitivity, it is best for the design with the lower NA of the two designs to have an $LP_{11}$-cutoff wavelength that is higher than that of the other design. In other words, the product of NA difference and $LP_{11}$-cutoff wavelength difference should preferably be negative. In still other words, in order to find an optimize second fiber core design with respect to the first fiber core design (reference marker in FIG. 10) one should move away from the reference design in a direction approximately to the top left or approximately to the bottom right in FIG. 10.

Another property to be taken into account for optimizing a pair of fiber core designs is group velocity dispersion. The background here is that the shape sensing console like optical fiber shape sensing system 10 typically contains an auxiliary interferometer that is used to linearize the laser scan. The auxiliary interferometer is built with a standard single-mode fiber (SMF 28), which has a group velocity dispersion of about 17 ps/nm/km. A difference in dispersion between the optical fiber sensor 12' or 12" and the auxiliary interferometer may give rise to systematic errors. Although methods exist for compensating dispersion differences, it is expected that the accuracy of dispersion compensation worsens with increasing dispersion difference. It is, therefore, advantageous and preferred if the dispersion values for the first and second fiber core designs of the multicore optical fiber sensor 12' or 12" do not differ from 17 ps/nm/km more than is necessary.

Figure 11:
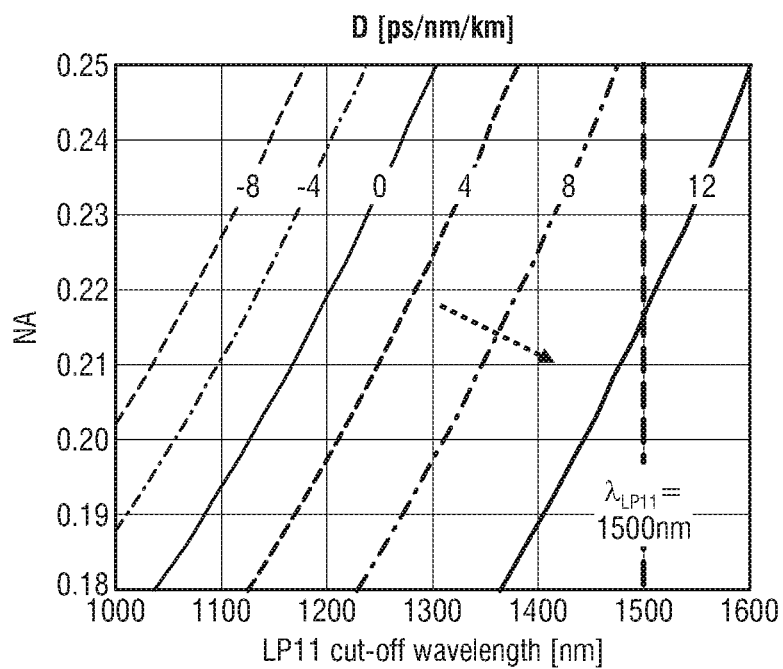
FIG. 11 shows a diagram illustrating contour lines of computed group velocity dispersion.

FIG. 11 shows a diagram of contour lines of computed group velocity dispersion values for several fiber core designs. The values in the contour lines are given in ps/nm/km. It can be seen that a dispersion value equal to that of SMF 28 cannot be reached in the ranges for NAs and cutoff wavelengths shown in the diagram, but that the difference increases drastically for fiber core designs with low cutoff wavelength and large NA. Fiber core designs falling in the upper-left part of the diagram should be avoided. The dotted arrow indicates the direction of increasing suitability of fiber core design.

Figure 12:
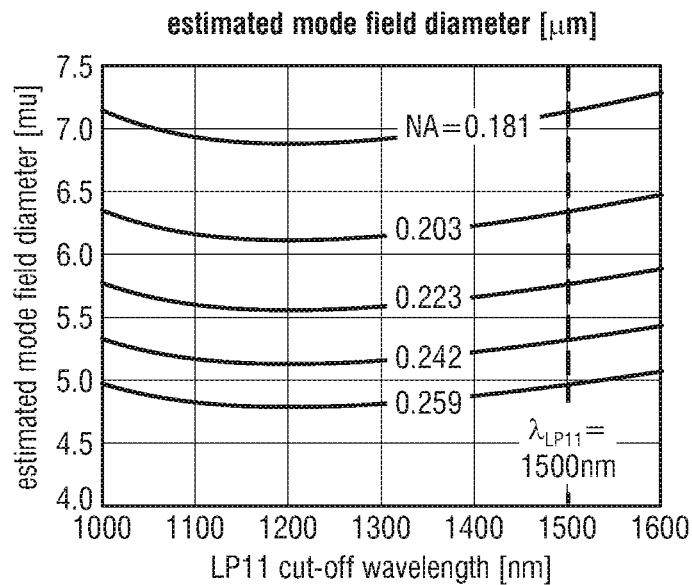
FIG. 12 shows a diagram illustrating estimated mode field diameter for a number of fiber core designs having different numerical apertures as a function of $LP_{11}$-cutoff wavelength.

Another property which may be relevant in the optimization of fiber core designs is the mode field diameter (MFD). In an optical connector, for example a connector for connecting the optical fiber sensor 12' or 12" to the optical shape sensing console or optical fiber shape sensing system 10, misalignments between optical fiber cores give rise to a loss of transmitted optical power. Causes of misalignments are, e.g., mechanical tolerances in the connectors and geometrical tolerances of fiber core positions in the multicore optical fiber. For a given misalignment, the losses are lower, when the size of the mode is larger. The size of the mode is expressed in terms of the mode field diameter (MFD). Computations of the MFD over a range of fiber core designs are shown in FIG. 12. It can be seen that the mode field diameter is relatively insensitive to $LP_{11}$-cutoff wavelength, and that desirable larger mode sizes correspond to lower NA values.

Further aspects of the optical fiber sensor 12' or 12" which may be relevant for the accuracy of optical shape sensing with the optical fiber sensor 12' or 12" are bend losses, UV sensitivity, and thermal stresses.

Figure 13:
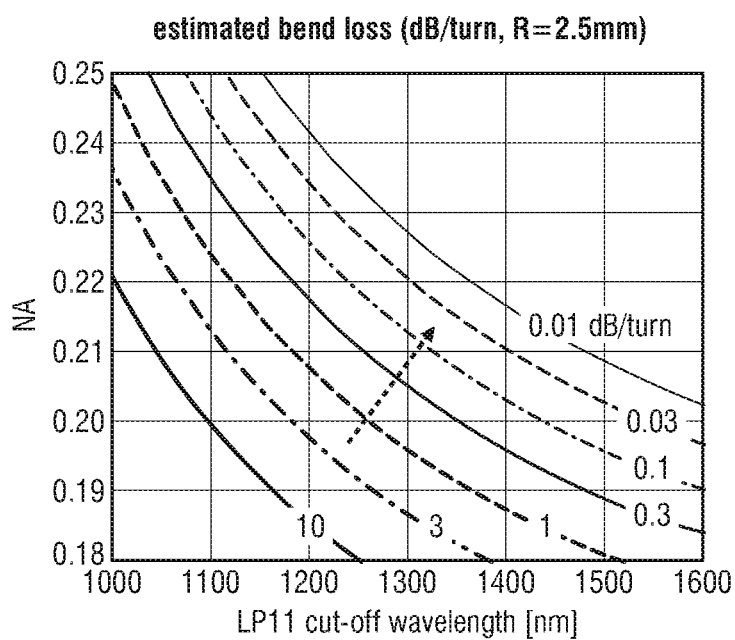
FIG. 13 shows a diagram illustrating estimated bend loss for a fixed bend radius for several fiber core designs.

As to bend losses, part of the light travelling in a fiber core can be lost, when the fiber sensor is bent. These losses are very sensitive to fiber core design and to bend radius. Contour lines of estimated bend loss for a very tight bend of 2.5 mm radius are shown in FIG. 13. The bend loss increases dramatically for fiber core designs with low $LP_{11}$-cutoff wavelength and low NA, i.e. fiber core designs in the lower-left region of the diagram. However, the bend losses for a bend with a radius twice as large, i.e. 5 mm bend radius, are considerably lower and will not pose a problem in the fiber core design range shown, except in the extreme lower-left region of FIG. 13. The bend loss is expressed in dB/turn in FIG. 13. The dotted arrow indicates the direction of increasing suitability of fiber core designs with respect to bend loss.

As to UV sensitivity, when the ratio of germanium concentrations of the two fiber core designs is too large, the optimum UV laser intensity for FBG inscription may become too different for the two fiber core designs, leading to suboptimal grating strength for one or both of the fiber core designs. This would pose a limit on the practical difference of NAs between the two fiber core designs.

As to thermal stresses, it is to be taken into account that the thermal expansion coefficient of a germanium-doped fiber core is different from the thermal expansion coefficient of the pure cladding material. The differences are approximately proportional to the NA of the fiber core. When the difference is too large, thermal stresses that are frozen in during the drawing process may increase the probability of cracks in the fiber, posing a limit on the maximum possible NA. In practice, an NA of the order of 0.3 should certainly be feasible.

In order to summarize the foregoing, for a sufficient separation of temperature effects and strain effects in the common mode signal and taking into account further properties of the optical fiber sensor for optimization of the accuracy of optical shape sensing using the optical fiber sensor 12' or 12", the following fiber core designs of the first subset of optical fiber cores (first fiber core design), e.g. optical fiber cores 14", 16", 18", 20" or 14', 16', 18', 20', and the second subset of optical fiber cores (second fiber core design), e.g. at least one optical fiber cores 34' or optical fiber cores 34", 36", 38", may be advantageous:

An absolute value of a difference between the numerical aperture of the first fiber core design and the numerical aperture of the second fiber core design may be in a range from 0.01 to 0.03.

The fiber core design having the lower NA may have an NA of at least 0.17.

The $LP_{11}$-cutoff wavelength of one or both of the fiber core designs may be in a range from 1100 nm to 1500 nm.

The fiber core design having the lower NA may have a $LP_{11}$-cutoff wavelength which is higher than the $LP_{11}$-cutoff wavelength of the fiber core design having the higher NA.

The resonance wavelength difference between the first and second fiber core designs may be equal to or less than 3 nm.

The temperature sensitivity difference between the first and second fiber core designs may be in a range from 0.5% to 2%.

The group velocity dispersion of the first and second fiber core designs may be in a range from 7 ps/nm/km to 20 ps/nm/km.

The optical fiber cores of the first fiber core design and/or the optical fiber cores of the second fiber core design may comprise a dopant, a concentration and/or material of which differs between the first and second fiber core designs.

The dopant may be $GeO_2$. The cladding of the optical fiber may comprise silica ($SiO_2$).

In an embodiment, the optical fiber sensor 12" in FIG. 3C which is a 7-fiber core optical fiber sensor may have the following characteristics. A first subset of optical fiber cores, e.g. optical fiber cores 14", 16", 18", 20", may have an NA which is higher than the NA of the second subset of optical fiber cores, e.g. optical fiber cores 34", 36", 38". The NA of the first subset may be approximately 0.215, and the NA of the second subset may be approximately 0.188. The first subset of optical fiber cores may have an $LP_{11}$-cutoff wavelength of approximately 1400 nm, and the second subset of optical fiber cores may have an $LP_{11}$-cutoff wavelength of approximately 1460 nm.

The optical fiber cores of the first subset (with the higher NA of approximately 0.215) exhibit the optical properties as represented by the circular dot in FIG. 10. This is the same fiber core design as the one for the "standard" 4-fiber core sensor as shown, for example in FIG. 3A. If this fiber core design is maintained for the first subset of optical fiber cores 14", 16", 18", 20" in the optical fiber sensor 12" in FIG. 3C, the optimum for the second fiber core design of the second subset of optical fiber cores 34", 36", 38" may be obtained by moving to the bottom-right of the plot of NA vs. $LP_{11}$ cutoff wavelength in FIG. 10.

Further properties of the embodiment described before may be as follows: The mode field diameter of the low-NA fiber core design (first subset of optical fiber cores) is approximately 6.8 μm, and for the high-NA fiber core design (second subset of optical fiber cores) approximately 5.9 μm. The group velocity dispersion for the low-NA fiber core design is approximately 12.5 ps/nm/km and for the high-NA fiber core design approximately 7.9 ps/nm/km.

The difference between the resonance wavelength of the low-NA design and the resonance wavelength of the high-NA fiber core design is approximately −1.545 nm. The signal level is identical (within 1 dB) for both fiber core designs (the signal level is determined by the amplitude reflectivity of the fiber Bragg gratings of the optical fiber cores). The difference of the temperature sensitivity of the low-NA fiber core design and the temperature sensitivity of the high NA fiber core design is −1.11%. The difference of strain sensitivity of the low-NA fiber core design and the strain sensitivity of the high-NA fiber core design is approximately 0.13%.

Figure 14:
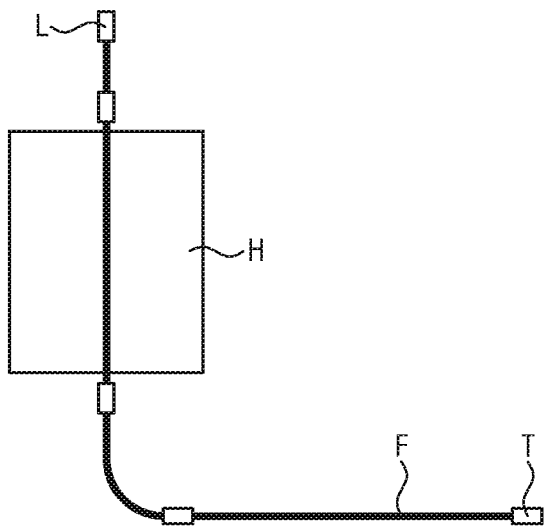
FIG. 14 shows a sketch of a setup for shape sensing experiments on an optical fiber sensor having seven optical fiber cores.

With respect to FIGS. 14 and 15, an experiment will be described which has been performed in order to show the improved accuracy of a 7-fiber core optical fiber sensor like optical fiber sensor 12" in FIG. 3C in relation to a 4-fiber core optical fiber sensor like optical fiber sensor 12 in FIG. 3A in shape sensing. FIG. 14 shows the setup of the experiment. An optical fiber sensor F has been placed and fixed in an L-shape on a flat table as shown in FIG. 14. L denotes the launch position from which shape reconstruction starts, and T the (distal) tip of the fiber F. H denotes a heater for applying heat to a part of the fiber sensor F. Two different fibers F have been examined, the one being a standard 4-core fiber sensor and the other a 7-core fiber sensor according to the principles of the present invention.

Figure 15:
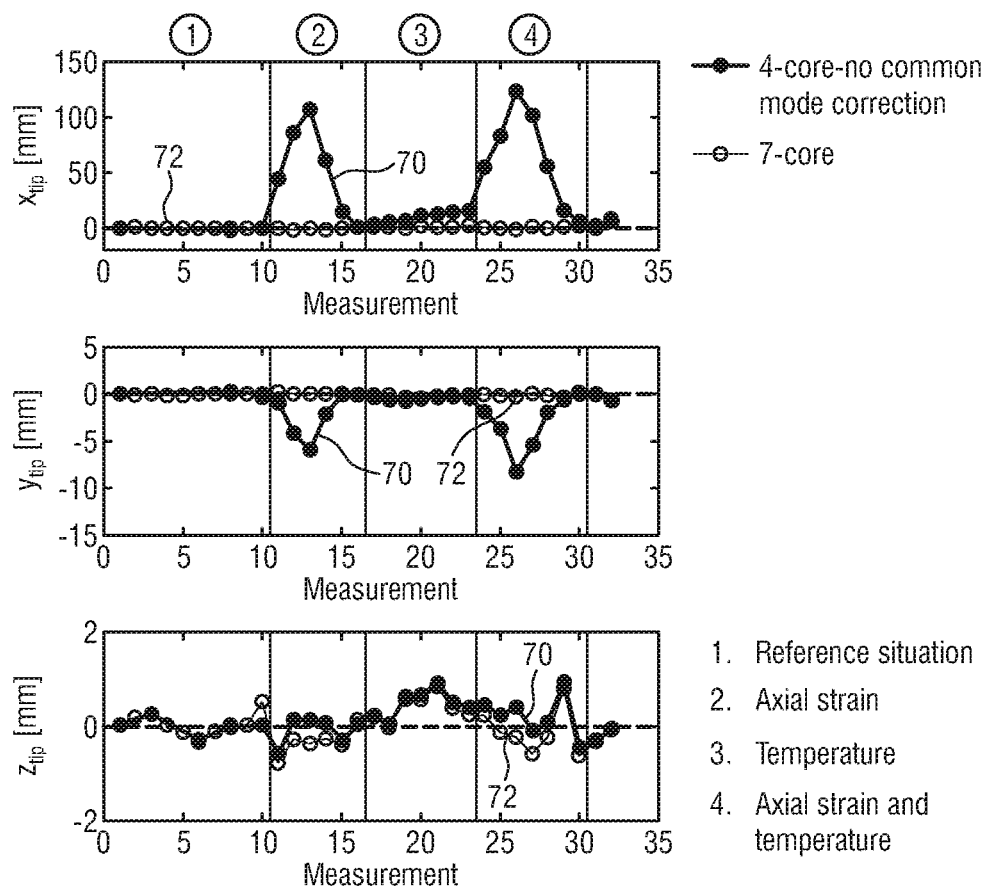
FIG. 15 shows results of the measurements carried out with the setup in FIG. 14 for a standard four fiber core optical fiber sensor and a seven fiber core optical fiber sensor according to the principles of the invention.

FIG. 15 shows the reconstructed position of the tip T for a sequence of 32 measurements (x-axis) carried on out on the standard 4-core fiber sensor and the 7-core fiber sensor according to the principles of the present invention. The 7-core fiber sensor used in the measurement corresponds to the afore-mentioned embodiment.

In a first subset of 10 measurements (shapes 1-10 in FIG. 15) neither axial strain nor heat was applied to the fiber sensor F. In a further subset of six measurements (shapes 11-16 in FIG. 15), only axial strain has been applied to the fiber sensor F. In a next subset of seven measurements (shapes 17-23 in FIG. 15), only heat (temperature change) has been applied to the fiber sensor F. In a further subset of seven measurements (shapes 24-30 in FIG. 15), both temperature change and axial strain have been applied to the fiber sensor F. The series of measurements is ended with two further measurements (shapes 31-32 in FIG. 15), wherein again no stimuli (neither axial strain nor heat) were applied. During each of the subseries of measurements, the axial strain and/or temperature has been ramped up and down. The maximum axial strain applied was about 1 ME over a length of 0.5 m, while the maximum temperature difference was about 20° C. across a length of 40 cm. The apparent position of the tip T resulting from the shape reconstruction is shown in FIG. 15. The x-direction gives the out-of-plane behavior, the error in the y-direction corresponds to deviations of the 90° bend angle, and the z-direction corresponds to elongation. Curves 70 show the position of the tip T in three directions (x, y, z) for the 4-fiber core design like that of the optical fiber sensor 12 in FIG. 3A, i.e. when axial strain and temperature cannot be discriminated from each other. The lack of disentanglement of axial strain from temperature results in an error of the calculated twist of the fiber sensor F. This leads to an erroneous angle of the 90° bend, and consequently a tilted shape in reconstruction. The errors are proportional to the amount of stimulus applied. Curves 72 show the position of the tip T for the 7-fiber core fiber sensor F according to the principles of the present invention. When the full data set of the 7-fiber core fiber sensor F is taken into account, the correct value for twist can be evaluated and only small deviations of the apparent position of the tip T from the true position of the tip T can be observed as depicted by the curves 72 in FIG. 15.

Note that the difference in temperature sensitivity of the optical fiber cores of the first and second subset (first and second fiber core designs) is only 1.1% in the embodiment described above. The resulting shape errors are reduced from more than 100 mm to the mm range when properly separating temperature and strain. Given the lever arm (z-coordinate of the tip T) of 0.8 m this means that the errors in the calculated twist are reduced from about 0.1 rad to as low as a few mrad.

The above shows that fiber core designs for optical fiber sensors can be obtained according to the principles of the present invention which provide good strain-temperature separation in a shape-sensing system balanced against other properties of the optical fiber sensor providing a high accuracy in optical shape sensing.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. An optical fiber sensor, comprising:
an optical fiber comprising: a cladding having a cladding refractive index; and
a plurality of optical fiber cores embedded in the cladding and extending along a longitudinal axis of the optical fiber, wherein: the plurality of optical fiber cores comprises a first subset of at least one first optical fiber core and a second subset of at least one second optical fiber core; the at least one first optical fiber core has at least one first fiber Bragg grating, and the at least one second optical fiber core has at least one second fiber Bragg grating; the at least one first optical fiber core has a first core refractive index different from the cladding refractive index and a first core radius in a direction transverse to the longitudinal axis; the at least one second optical fiber core has a second core refractive index different from the cladding refractive index and a second core radius transverse to the longitudinal axis; and the second core refractive index and the second core radius of the at least one second optical fiber core differ from the first core refractive index and the first core radius.

2. The optical fiber sensor of claim 1, wherein the second core refractive index and the second core radius with respect to the first core refractive index and the first core radius are such that an absolute value of a difference between a first numerical aperture of the at least one first optical fiber core and a second numerical aperture of the at least one second optical fiber core is at least 0.01.

3. The optical fiber sensor of claim 1, wherein the second core refractive index and the second core radius with respect to the first core refractive index and the first core radius are such that an absolute value of a difference between a first numerical aperture of the at least one first optical fiber core and a second numerical aperture of the at least one second optical fiber core is at most 0.03.

4. The optical fiber sensor of claim 1, wherein the first core refractive index and the first core radius are chosen such that a first numerical aperture of the at least one first optical fiber core is at least 0.17, and wherein the second core refractive index and the second core radius are chosen such that a second numerical aperture of the at least one second optical fiber core is different than the first numerical aperture.

5. The optical fiber sensor of claim 1, wherein the second core refractive index and the second core radius are such that a second $LP_{11}$-cutoff wavelength for single mode behavior of the at least one second optical fiber core is less than 1500 nm and greater than 1100 nm, and/or the first core refractive index and the first core radius are such that a first $LP_{11}$-cutoff wavelength for single mode behavior of the at least one first optical fiber core is below 1500 nm and above 1100 nm.

6. The optical fiber sensor of claim 5, wherein the first core refractive index and the first core radius are such that a first $LP_{11}$-cutoff wavelength for single mode behavior of the at least one first optical fiber core is less than 1500 nm and greater than 1100 nm.

7. The optical fiber sensor of claim 1, wherein the first core refractive index and the first core radius are such that a first $LP_{11}$-cutoff wavelength for single mode behavior of the at least one first optical fiber core is less than 1500 nm and greater than 1100 nm.

8. The optical fiber sensor of claim 1, wherein the second core refractive index, the second core radius, the first core refractive index and the first core radius are such that a product of a difference between a first numerical aperture of the at least one first optical fiber core and a second numerical aperture of the at least one second optical fiber core and a difference between a first $LP_{11}$-cutoff wavelength of the at least one first optical fiber core and a second $LP_{11}$-cutoff wavelength of the at least one second optical fiber core has a negative value.

9. The optical fiber sensor of claim 1, wherein the at least one first fiber Bragg grating has a first resonance wavelength when exposed to light in an unstrained state of the optical fiber core, and the at least one second fiber Bragg grating has a second resonance wavelength when exposed to light in an unstrained state of the optical fiber core, wherein an absolute value of a difference between the first and second resonance wavelengths is equal to or less than 3 nm.

10. The optical fiber sensor of claim 1, wherein a second temperature sensitivity of the at least one second optical fiber core differs from a first temperature sensitivity of the at least one first optical fiber core by an absolute value in a range from 0.5% to 2%.

11. The optical fiber sensor of claim 1, wherein the second core refractive index and the second core radius are such that a second group velocity dispersion of the at least one second optical fiber core is in a range from 7 ps/nm/km to 20 ps/nm/km.

12. The optical fiber sensor of claim 11, wherein the first core refractive index and the first core radius are chosen such that a first group velocity dispersion of the at least one first optical fiber core is in a range from 7 ps/nm/km to 20 ps/nm/km.

13. The optical fiber sensor of claim 1, wherein the first core refractive index and the first core radius are chosen such that a first group velocity dispersion of the at least one first optical fiber core is in a range from 7 ps/nm/km to 20 ps/nm/km.

14. The optical fiber sensor of claim 1, wherein the first core refractive index and the first core radius are such that the at least one first optical fiber core has a mode field diameter of at least 5 μm, and/or the second core refractive index and the second core radius are chosen such that the at least one second optical fiber core has a mode field diameter of at least 5 μm.

15. The optical fiber sensor of claim 14, wherein the second core refractive index and the second core radius are chosen such that the at least one second optical fiber core has a mode field diameter of at least 5 μm.

16. The optical fiber sensor of claim 1, wherein the second core refractive index and the second core radius are chosen such that the at least one second optical fiber core has a mode field diameter of at least 5 μm.

17. The optical fiber sensor of claim 1, wherein the at least one first optical fiber core and the at least one second optical fiber core comprise a dopant, wherein at least one of a concentration and a material the dopant differs between the at least one first optical fiber core and the at least one second optical fiber core.

18. The optical fiber sensor of claim 17, wherein the dopant is $GeO_2$.

19. The optical fiber sensor of claim 1, wherein the at least one first optical fiber core and the at least one second optical fiber core have substantially equal sensitivities to UV radiation.

20. The optical fiber sensor of claim 1, wherein the cladding comprises $SiO_2$.

\* \* \* \* \*